United States Patent Office 3,256,095
Patented June 14, 1966

3,256,095
NUTRITIONAL UTILIZATION OF AMINO ACID AMIDES AND ACID SALTS THEREOF
Donald G. Crosby, Davis, Calif., and Herbert E. Johnson, South Charleston, W. Va., assignors to Union Carbide Corporation, a corporation of New York
No Drawing. Filed Oct. 17, 1962, Ser. No. 231,269
13 Claims. (Cl. 99—2)

The present invention relates to the use of amides of nutritional amino acids and the acid salts thereof as nutrients. More particularly the present invention relates to food compositions containing the amides of the nutritional amino acids or the acid salts thereof, and the method of obtaining proper nutrition through their use.

It has long been known in the art that in order to obtain proper nutrition, the diet of animals must contain certain amounts of nutritional amino acids.

Presently included within the category of nutritional amino acids are glycine, alanine, valine, leucine, isoleucine, phenylalanine, tyrosine, proline, hydroxyproline, serine, threonine, cysteine, cystine, methionine, tryptophan, aspartic acid, glutamic acid, arginine, lysine and histidine, although others can be expected to find future importance in this category. The nutritional amino acids have been divided into two categories: dispensable amino acids and indispensable amino acids. Dispensable amino acids are those amino acids which are necessary for proper growth metabolism and nutrition but which the animal can synthesize itself when presented with proper raw materials. The indispensable amino acids are those amino acids which are necessary for proper growth, metabolism, and nutrition but which cannot be synthesized by the animal system; these amino acids or their close derivatives *must* be present in its diet.

If an indispensable amino acid is not present in the diet in a sufficient amount, the growth of the animal is retarded and one or several deficiency diseases can result. If an indispensable amino acid is totally lacking from the diet for a prolonged period of time, death to the animal will result.

Classification of an amino acid as an indispensable or dispensable amino acid can only be determined for a given animal system. The number and types of amino acids indispensable to an animal system vary from species to species. For example, the rat requires an intake of ten amino acids as indispensable; man requires only eight.

In nature, animals generally fulfill their amino acid requirements through the intake of protein which is hydrolyzed in the digestive tract to form its constituent amino acids. Due to the relatively high cost, frequent lack of availability, weight and inefficient utilization of protein-containing foods, it is not always feasible or possible to provide animals with a diet which will meet all the amino acid requirements and thus insure optimum growth and good health of the animal. This is especially true of domestic animals and poultry where cost is a major factor. It is also true for man under certain conditions. Livestock and poultry feeds are generally manufactured from grain or vegetable materials which are available on the market at low cost. These feeds generally contain sufficient amounts of protein to provide sustaining amounts of all the amino acids but not always in sufficient amounts to maximize the growth of the animal, which is of extreme importance.

Deficiencies of animal feeds can generally be overcome by providing supplements to the feeds, and to the extent feasible this is done. However, due to the high cost and limited availability of amino acids, it is generally only feasible to use amino acid supplementation where the value of the animal justifies the increased cost. The cost of amino acid supplemented feed in the quantity necessary to feed general livestock, for instance, would not only be prohibitive but the expenditure might not be recovered in the growth increase obtained.

For man, the desirability of proper amino acid content and balance in the diet is of even greater importance. In countries of large population and low protein availability, the diet of the majority of the population may not meet the minimum amino acid requirements with the result that the growth and health of the population suffers. In every country the poorer element of society suffers from marginal amino acid diet due to the high cost of proper protein foods. Amino acid supplementation has now been shown to be of greatest potential importance in overcoming the protein malnutrition now being felt by a majority of the world's population, but again expense and lack of availability are prime deterrents.

In specialized areas where weight and bulk become prime factors, as in manned rocket flights, nutrition through use of pure amino acids becomes very important; protein foods are too heavy and bulky for the nutrition which they provide. When used for such purposes, cost and availability perhaps are less important, but toxicity levels become very important. Amino acids can be quite toxic in overdose or imbalance and measurement becomes critical.

Another important use of amino acids lies in nutrition of mutant strains of microorganisms which are of increasing practical value in carrying out synthesis of vitamins, biologicals, and even "heavy chemicals" by fermentation processes. A major U.S. industry is based on the growth and chemical activities of these bacteria, molds, and yeasts. Vast quantities of nutrients are being required to maintain special fermentation processes.

While, as has been stated, many of these problems might be overcome through the use of amino acids supplementation, the cost, unavailability, and toxicity of these compounds make their general use technically and economically unacceptable.

In accordance with the present invention, it has been found that the amides of the nutritional amino acids and the acid salts thereof can be effectively utilized to replace the corresponding amino acids for the nutrition of animals and microorganisms or can be used with standard dietary formulations as supplements to insure the adequate intake of amino acids. The amides of the nutritional amino acids and the acid salts of the amides of the nutritional amino acids can be produced economically and in large quantity at low cost—a fraction of that of the amino acids—which insures a ready availability. The amides of the nutritional amino acids and the acid salts thereof can be utilized as feed supplements and as ingredients in the preparation of culture media with greater facility than can the corresponding amino acids, as they are generally much less toxic, more soluble, and frequently more effective biologically.

The acid salts of the nutritional amino acid amides are more easily administered than are the corresponding nutritional amino acid amides due to their high solubility. The toxicity, however, of the acid salts is dependent upon the acid used and the animal system to which it is applied. For example, a hydrogen cyanide salt of methioninamide would be totally unacceptable for use with mammals as this acid would hydrolyze off from the amino group and would adversely affect the mammal, but certain bacteria might thrive on the hydrogen cyanide salt of methioninamide. The toxicity of the known acids in various animal systems is well known in the art. It is of course necessary that an acid salt be selected whose toxicity levels are such that no toxic effects shall be produced when a nutritional amount of the acid salt of the nutritional amino acid amide is introduced into a given animal system. The amides of the nutritional amino acids have toxicity levels about one-third that of the corresponding amino acid. The selection of the acid salt therefore is determined solely on the basis of the toxicity of the acid in the system to be used. As stated, this is well within the skill of the art.

Both the amides of the nutritional amino acids and the acid salts thereof exhibit a high degree of stability which becomes an important factor if the feeds or diets are to be stored for any length of time.

The nutritional amino acid amides are also classified by their chemical structure. They may be grouped as monoamino-monocarboxylic acids; monoamino-dicarboxylic acids; diamino-monocarboxylic acids; and heterocyclic amino acids.

The group monoamino-monocarboxylic acid can be subclassified into the sulfur containing monoamino-monocarboxylic acids and the sulfur-free monoamino-monocarboxylic acids. The nutritional amino acid amides and the acid salts thereof can likewise be classified as sulfur-free and sulfur-containing nutritional amino acids and their acid salts.

The group of heterocyclic nutritional amino acids all contain only heterocyclic nitrogen atoms.

Contemplated within the scope of this invention are the amides of the nutritional sulfur-free monoamino-monocarboxylic acids, such as glycinamide (aminoacetamide), alaninamide ($\alpha$-aminopropionamide), valinamide ($\alpha$-amino-isovaleramide), leucinamide ($\alpha$-amino-isocaproamide), isoleucinamide ($\alpha$-amino-$\beta$-methylethylpropionamide), phenylalaninamide ($\alpha$-amino-$\beta$-phenylpropionamide), tyrosinamide ($\alpha$-amino-$\beta$-hydroxyphenylpropionamide), serinamide ($\alpha$-amino-$\beta$-hydroxy propionamide), threoninamide ($\alpha$-amino-$\beta$-hydroxybutyramide), and the like; the amides of the sulfur-containing nutritional amino acids such as methioninamide ($\alpha$-amino-$\gamma$-methylthiobutyramide), systeinamide ($\alpha$-amino-$\beta$-thiopropionamide), and the like; the amides of the nutritional monoamino-dicarboxylic acid such as aspartic acid diamide ($\alpha$-amino succinic acid diamide), glutamic acid diamide ($\alpha$-aminoglutaric acid diamide) and the like; the amides of the nutritional diamino-monocarboxylic acid, such as arginamide ($\alpha$-amino-$\delta$-guanidine valeramide), lysinamide ($\alpha,\epsilon$-diamino-caproamide), and the like; and the amides of the nutritional heterocyclic amino acids, such as histidinamide ($\alpha$-amino-$\beta$-imidazolepropionamide), tryptophanamide ($\alpha$-amino-$\beta$-indolepropionamide), prolinamide ($\alpha$-pyrrolidine carboxamide), hydroxy prolinamide ($\nu$-hydroxy-$\alpha$-pyrrolidine carboxamide) and the like.

Also contemplated as being within the scope of this invention are the non-toxic acid salts of the above defined nutritional amino acid amides. Illustrative of said non-toxic acid salts are the organic acid salts such as acetates, butyrates, phenylacetates, benzoates and the like; and the inorganic acid salts such as hydrochlorides, hydrobromides, hydroiodides carbonates, phosphates, phosphites, sulfates, sulfites and the like.

It should be noted that all of the above amides of the nutritional amino acids and the non-toxic acid salts thereof can be used singly or in any combination. However, it has been demonstrated that the sulfur containing monoaminomonocarboxylic acid amides, such as methioninamide, function properly at optimum efficiency when administered in combination with relatively large amounts of fat or fat containing foods. Since this is seldom desirable in food and feed compositions due to the tendency of fats to become rancid in storage, and the tendency of high fat content to make foods unappealing, it is not desirable to include the amides of the sulfur containing nutritional amino acids, more specifically the nutritional sulfur containing monoaminomonocarboxylic acid amides, in food compositions, unless fats can be used in excess of 5 percent by weight of the total weight of the food composition; such food compositions would generally be made up for a laboratory basal diet, which is not to be stored for any length of time.

However, in food and feed compositions, where long storage periods are both possible and probable, it is desirable to exclude all but minor amounts of fat and to also exclude the amides of the sulfur containing nutritional amino acids. The omission of these amino acids from the diet can, if desired, be made up from other sources which can be separately used to supplement the sulfur free amino acid amide food composition, and to which fat may be added.

It should be noted however, that while the amides of the sulfur containing nutritional amino acids have been reported to require the presence of relatively high concentrations of fat to function properly and efficiently, the acid salts of these sulfur containing amino acid amides have not been found to require the presence of fats to function at optimum efficiency. It is therefore preferred, in all food compositions where the sulfur containing nutritional amino acids are required, to use the non-toxic acid salts of the amides of the sulfur containing amino acids.

In those food compositions where sulfur-free nutritional amino acids are required, either the amide of the sulfur-free nutritional amino acid or the acid salt thereof may be used.

As has been stated above the acid salt is selected as being non-toxic to the system to be used at the dosage to be used.

The amides of the nutritional amino acids can be administered to animals directly or as a supplement in combination with food or feedstuffs. They can be administered as crystalline powders, pastes, pellets, capsules or the like, or in solution; they may be mixed with other substances such as antibiotics, vitamins, minerals, or drugs generally, when simultaneous administration is desired.

The acid salts of the nutritional amino acid amides can be administered in a manner similar to that described for amino acid amides above. Likewise, the amino acid amide salts can be administered as aqueous solutions as they are highly water soluble. These acid salts can also be more easily blended with other dietary ingredients as aqueous solutions. For these reasons, it is preferred to use the acid salts of the nutritional amino acid amides.

While the amides of the nutritional amino acids and the non-toxic salts thereof can be administered both directly and as supplements, the non-toxic acid salts can be administered to mammals intravenously. This factor is of extreme importance when it is desired or necessary to avoid ingestion. When the acid salts are to be used in this manner, it is preferred to use the hydrochloride, phosphate, citrate, or acetate salts as they are normal constituents of the blood.

When the amides of the nutritional amino acids or the non-toxic acid salts thereof are to be administered as food supplements, they can be simply admixed with normal foods, coated on such foods, or administered separately. When used as a supplement to grain to be used for livestock or poultry it is preferred to coat the grain with the supplement. This can be done through the use of binders or by solution coating in the case of the acid salts.

By any mode of administration, both the amides of the nutritional amino acids and the non-toxic acid salts thereof can be used singly or in any combination or mixture. Indispensable and dispensable amino acid amides and/or the salts thereof may be used in any combination, in nutritional, non-toxic amounts.

Both the amides of the nutritional amino acids and the non-toxic acid salts thereof should be administered in a nutritional amount or as necessary to bring the total amino acid intake into balance. This amount will vary from species to species for the particular amide or acid salt to be administered. It will also vary with the nutritional adequacy of the food. Generally, a nutritional amount will be from one to three times the daily requirement of the species for the corresponding amino acid. The amino acid requirements of the various animal systems are well known in the art.

By way of example, if the normal daily leucine requirement of a pig is one-tenth mole, then up to one-tenth mole of leucinamide or leucinamide acid salt can be substituted therefor. When the required amino acid is an optical isomer such as L-leucine, then twice the mole equivalent amount of DL-Leucinamide or a non-toxic acid salt of DL-Leucinamide would be required for complete effectiveness. In such a case, the D-form would pass unaffected through the system as waste with no toxic effects.

As has been stated above, the amino acid amides and the non-toxic acid salts thereof are less toxic than the corresponding amino acids and up to at least three times the mole equivalent amount may be used with safety.

In the examples that follow, the animals used were male Swiss mice weighing about fifteen grams each. These mice were maintained in standard laboratory "mouse cages" in groups of ten per cage. The animals were fed water and diet ad libitum for a period of from two to four weeks and were weighed daily. The animals were divided into three groups: Positive Control Group, Negative Control Group and Experimental Group.

A complete synethtic diet (Basal diet) was prepared having the following composition:

TABLE I

*Complete synthetic diet*

[Amounts to make 1 kilogram of diet]

| | | |
|---|---|---|
| Riboflavin | mg | 6 |
| Pyridoxine | mg | 6 |
| Thiamine | mg | 6 |
| Ca pantothenate | mg | 30 |
| Niacin | mg | 25 |
| Menadione | mg | 5 |
| Inositol | mg | 1 |
| Salt mix "W" | gm | 40 |
| Alphacel [1] | gm | 100 |
| NaHCO$_3$ | gm | 17.5 |
| B$_{12}$ (10 mg./ml.) | mg | 0.05 |
| Biotin (250 mg./ml.) | mg | 0.5 |
| Choline (2 gm./5 ml.) | gm | 2 |
| Folic acid (1 mg./ml.) | mg | 2 |
| Corn oil | gm | 80 |
| Cod liver oil | gm | 20 |
| Tocopherol | mg | 200 |
| Sugar | gm | 660.1 |
| L-lysine HCL | gm | 13.7 |
| DL-tryptophan | gm | 4 |
| L-histidine HCL | gm | 5.5 |
| DL-phenylalamine | gm | 9 |
| L-leucine | gm | 8 |
| DL-isoleucine | gm | 10 |
| DL-threonine | gm | 10 |
| DL-methionine | gm | 9 |
| DL-valine | gm | 14 |
| L-arginine | gm | 13.5 |
| L-glutamic acid | gm | 51 |
| DL-serine | gm | 5 |
| L-tyrosine | gm | 10 |
| DL-alanine | gm | 4 |
| L-asparagine | gm | 10 |
| Glycine | gm | 20 |

[1] Non-nutrients were not included in total weight of diet.

The positive controls in each of the experiments received this "Basal Diet." The negative controls received the basal diet with deletion of the amino acid indicated in each experiment. The experimental groups received the basal diet from which the indicated amino acid had been omitted and for which the corresponding amino acid amide, or amino acid amide salt had been substituted. Other modifications are noted in each example.

EXAMPLE I

An experimental group of mice was maintained on an experimental diet identical to the basal diet except that that amino acid *valine* was omitted and an equivalent amount of *DL-valinamide hydrochloride* was substituted therefore. Both positive and negative controls were maintained during the experiment. This experiment was conducted over a period of 28 days.

The results based upon the average weight gain or loss of the mice, showed that the valine-free diet, containing the substitute *DL-valinamide hydrochloride* is equivalent to the basal diet containing valine as both groups gained weight steadily. The control group which had been fed the valine-free diet showed a steady loss over the same period.

At the end of the twenty-eight day period the average total weight gain/loss in grams for the three groups was as follows:

| | |
|---|---|
| Basal diet | +7.1 |
| Valine free-plus DL-valinamide hydrochloride | +6.4 |
| Valine-free diet | −5.1 |

Many animals in the negative control group died of malnutrition during this period and the remainder were very sick. The experimental group receiving the amide salt were as healthy and vigorous as those on the basal diet.

In a manner similar to that described in Example I, leucine, isoleucine, phenylalanine, methionine, and tryptophan were singly replaced with their corresponding amide hydrochlorides. A positive and negative control group and an experimental group were maintained in each case. The positive control group was fed the Basal Diet. The negative control group was fed the diet from which the single selected amino acid had been deleted. The experimental group was fed the identical negative control diet, except that the deleted amino acid had been replaced with the amide hydrochloride corresponding to the selected deleted amino acid.

The results obtained were comparable with the results of Example I. The positive control group and the experimental group maintained on the diet containing the substituted amino acid amide hydrochloride showed a steady weight gain and continued health and vigor equivalent within experimental error, while the negative control group from which the single selected amino acid had been withheld, showed a steady weight loss, sickness and high rate of mortality.

This clearly demonstrates that the amino acid amide hydrogen chlorides are equivalent nutritional substitutes for their corresponding amino acids.

EXAMPLE II

In a manner similar to that of Example I, an experiment was conducted to determine and compare the effect of optical isomerism on nutrition in relation to amino acids and their corresponding amide acid salts.

In this experiment two control groups were maintained. A positive control group and a negative control group. The positive control was maintained on the basal diet; the negative control group was maintained on an L-leucine-free basal diet.

Two experimental groups of mice were maintained; one group was maintained on an L-leucine free basal diet to which had been added an amount of L-leucinamide hydrochloride equivalent to the amount of L-leucine deleted. The second experimental group was maintained on an L-leucine free basal diet to which had been added an amount of DL-leucinamide hydrochloride, equivalent to twice the amount of L-leucine deleted. The experiment was run for a period of 18 days.

The results of this experiment showed that L-leucine, L-leucinamide hydrochloride, and DL-leucinamide hydrochloride are almost identical in their nutritional effect provided the DL isomer is used at twice the level of the L-isomer.

At the end of the eighteen day period the average total weight gain/loss in grams for the four groups were as follows:

Basal diet _____ grams__ +6
Leucine-free plus DL-leucinamide hydrochloride
 grams__ +5
Leucine-free plus L-leucinamide hydrochloride
 grams__ +5
Leucine free diet _____ do____ −4.8

Animals on the leucine-free diet sickened and died; all other groups remained in normal health.

In a similar manner L-isoleucine hydrochloride and DL-isoleucinamide hydrochloride were tested. The results obtained were similar to those obtained for L-leucine hydrochloride and DL-leucinamide hydrochloride. Only about one-half of the DL-isoleucinamide was utilized by the mouse as L-isoleucine.

EXAMPLE III

Experiments were conducted to determine the utility of administering amino acid amide salts in aqueous solution.

As in the above examples, positive and negative control groups were maintained: the positive control group receiving the basal diet, the negative control group receiving a valine-free basal diet.

Two experimental groups were maintained: both groups receiving valine-free basal diets. One experimental group was given, in place of drinking water, a four percent (by weight) aqueous solution of DL-valinamide acetate. The other experimental group was given, in place of drinking water, a four percent (by weight) aqueous solution of DL-valinamide hydrochloride. The experiment was run for a period of thirty days.

During the period the mice in the negative control group steadily lost weight as was expected.

The mice in the positive control group and in the two experimental groups all gained weight steadily until the fourteenth day, at which time the experimental group on aqueous DL-valinamide hydrochloride suddenly started to lose weight. It was found that an accidental build-up of salt concentration at the drinking spout had caused the animals to limit their intake of water and hence of valinamide hydrochloride upon removal of the salt accumulation, the animals again resumed growth. The mice on the basal diet and the experimental group receiving aqueous DL-valinamide acetate gained weight steadily over the thirty day test period and attained almost identical weight gain.

At the end of the thirty day period the average total weight gain/loss in grams for the groups were as follows:

Basal diet _____ grams__ +8.9
Valine free diet plus DL-valinamide acetate in
 water _____ grams__ +9.1
Valine free diet plus DL-valinamide hydrochloride in water _____ grams__ +3.59
Valine free diet _____ do____ +0.5

In an identical manner, the experiment of Example III can be repeated for each of the following amino acid amide salts:

(1) Leucinamide hydrochloride
(2) Isoleucinamide hydrochloride
(3) Phenylalaninamide hydrochloride
(4) Methioninamide hydrochloride
(5) Tryptophanamide acetate
(6) Histidinamide butyrate
(7) Histidinamide hydrochloride In each case the results for the experimental animals would be comparable with those for the corresponding positive control animals, showing the generality of the beneficial effect.

EXAMPLE IV

In order to determine the effect of multiple replacement of amino acids on animals, one group of mice was fed a basal diet from which the following amino acids had been deleted:

Valine
Phenylalanine
Methionine

A second group of mice received a diet from which the above amino acids had been replaced with an equivalent amount of their amide hydrochlorides.

A control group was maintained on the standard basal diet.

The experiment was conducted for a period of 12 days. The group of mice on the amino acid amide hydrochloride diet had increased 34 percent in weight. Those on the basal diet had increased 36 percent in weight. Animals in both groups remained active and healthy. The negative control group, which had received the valine-phenylalanine-methionine-free diet, had lost 32 percent in weight and one-half of the animals were dead.

EXAMPLE V

In order to determine the effect of excess amino acid amide on growth, valinamide hydrochloride was administered to mice in a valine-free basal diet at twice and three times the normal level. A control group received the basal diet. Those mice fed twice the normal level of amide grew much better than those mice on the basal diet. Those mice receiving three times the normal level of the valinamide hydrochloride grew an amount equal to the controls receiving the basal diet.

This experiment was repeated using the amino acid valine instead of valinamide hydrochloride. The results of this experiment showed that even a 25 percent increase in the amino acid level was detrimental to growth.

EXAMPLE VI

Example I was repeated exactly, except that DL-valinamide was used in place of its hydrochloride salt.

The animals were maintained on test for a period of 12 days, after which time, the following results were noted:

Valine-free basal diet with
  equivalent of valinamide _____ 34 percent increase
    in weight.
Basal diet controls _____ 20 percent increase
    in weight.
Valine-free basal diet _____ 30 percent loss
    in weight.

In a similar manner this experiment can be repeated in which the following free amino acid amides were used to replace their corresponding amino acids in the basal diet single, in mole equivalent amounts; the results would be comparable to those described above for valinamide.

Phenylalaninamide          Isoleucinamide
Alaninamide                Tryptophanamide
Leucinamide                Histidinamide

EXAMPLE VII

The ability of amides to replace the corresponding amino acids in the nutrition of bacterial mutants was determined by substituting the amides for their corresponding amino acids in nutrient media and growing strains of *Escherichia coli* on the media. The growth rate was determined by measuring the change in colony diameter in the standard way.

A culture medium having the following composition was prepared:

Glucose _____ grams__ 4.0
$NH_4Cl$ _____ do____ 1.0
$K_2HPO_4$ _____ 7.32

| | |
|---|---|
| KH$_2$PO$_4$ | 3.0 |
| MgSO$_4$ | 0.12 |
| Agar | 20.0 |
| Distilled water _____liter | 1.0 |

(Autoclaved separately.)

The individual amino acids or corresponding amides were added separately, for stock culture of the amino acid-requiring strains, so that the final concentration of the amino acid was 0.1 milligram per milliliter.

In the preparation of each of the media one of the test compounds was incorporated in various amounts.

For example, two different strains of the bacterium were used which could not grow without the presence of methionine in the medium. As shown below, methioninamide hydrochloride served as well as the amino acid in this very specific test. Other amides of their salts were equally effective for growth of their respective amino acid requiring mutants.

| Methionine µg./disc concentration: | E. coli M 26–18, zone diameter in millimeters |
|---|---|
| 0 | 12.7 |
| 5 | 34.5 |
| 10 | 37.5 |
| 20 | 40 |
| 40 | 44 |
| 100 | 50 |

| Methioninamide hydrochloride µg./disc: | E. coli M 26–18, zone diameter in millimeters |
|---|---|
| 0 | 12.7 |
| 25 | 20 |
| 50 | 25 |
| 100 | 29 |
| 200 | 38 |
| 400 | 45 |

| Methionine µg./disc concentration: | E. coli M 122–33, zone diameter in millimeters |
|---|---|
| 0 | 12.7 |
| 5 | 29.4 |
| 10 | 30.8 |
| 20 | 32 |
| 40 | 38.5 |
| 100 | 46 |

| Methioninamide hydrochloride µg./disc concentration: | E. coli M 122–33, zone diameter in milliliters |
|---|---|
| 0 | 12.7 |
| 25 | 15.5 |
| 50 | 25 |
| 100 | 30 |
| 200 | 40.5 |
| 400 | 48.5 |

What is claimed is:

1. A method of promoting optimum growth and health of an animal whose diet is deficient in indispensable amino acids which comprises administering to the said animal a nutritional amount of a member selected from the group consisting of amides of the sulfur-free amino acids that are indispensable to the system of the said animal and non-toxic acid salts of the amides of the amino acids that are indispensable to the system of the said animal.

2. A method of promoting optimum growth and health of an animal whose diet is deficient in a particular sulfur-free amino acid that is indispensable to the system of the said animal which comprises administering to the said animal a nutritional amount of an amide of the said sulfur-free amino acid.

3. A method of promoting optimum growth and health of an animal whose diet is deficient in a particular amino acid that is indispensable to the system of the said animal which comprises administering to the said animal a nutritional amount of a non-toxic acid salt of an amide of the said amino acid.

4. A method of promoting optimum growth and health of an animal whose diet is deficient in indispensable amino acids which comprises administering to the said animal a member selected from the group consisting of amides of the sulfur-free amino acids that are indispensable to the system of the said animal and non-toxic acid salts of the amides of the amino acids that are indispensable to the system of the said animal, in an amount equal to from about one to about three times the requirement of the said animal for the corresponding amino acid.

5. A method of promoting optimum growth and health of an animal whose diet is deficient in indispensable amino acids which comprises feeding to the said animal a food composition containing as a dietary supplement a member selected from the group consisting of amides of the sulfur-free amino acids that are indispensable to the system of the said animal and non-toxic acid salts of the amides of the amino acids that are indispensable to the system of the said animal.

6. A method of promoting optimum growth and health of an animal whose diet is deficient in indispensable amino acids which comprises dissolving in the water which the said animal drinks a nutritional amount of a non-toxic acid salt of an amide of an amino acid that is indispensable to the system of the said animal.

7. A method of promoting optimum growth and health of a mammal whose diet is deficient in indispensable amino acids which comprises administering intravenously to the said mammal a nutritional amount of an acetate salt of an amide of an amino acid that is indispensable to the system of the said mammal.

8. A method of promoting optimum growth and health of a mammal whose diet is deficient in indispensable amino acids which comprises administering intravenously to the said mammal a nutritional amount of a citrate salt of an amide of an amino acid that is indispensable to the system of the said mammal.

9. The method of claim 2 wherein the amide of the sulfur-free amino acid is valinamide.

10. The method of claim 2 wherein the amide of the sulfur-free amino acid is phenylalaninamide.

11. The method of claim 3 wherein the non-toxic acid salt is an acetic acid salt.

12. The method of claim 3 wherein the non-toxic acid salt is a hydrochloric acid salt.

13. The method of claim 3 wherein the non-toxic acid salt of an amide of an amino acid is leucinamide hydrochloride.

References Cited by the Examiner

UNITED STATES PATENTS

| | | | |
|---|---|---|---|
| 2,718,467 | 9/1955 | Belasco et al. | 99—2 |
| 2,965,488 | 12/1960 | Belasco | 99—2 |

OTHER REFERENCES

Chemical Abstracts, vol. 53, No. 4, p. 3339d, Feb. 25, 1959.

Benesch: Nature, vol. 147, May 3, 1941, pp. 531–4.

A. LOUIS MONACELL, *Primary Examiner.*

D. DONOVAN, *Assistant Examiner.*